Patented Sept. 18, 1951

2,568,020

UNITED STATES PATENT OFFICE 2,568,020

METHOD OF PREPARING CARBOTHIOLIC ACIDS

John C. McCool, Akron, Ohio, assignor to The B. F. Goodrich Company, New York, N. Y., a corporation of New York No Drawing. Application June 3, 1949, Serial No. 97,081

3 Claims. (Cl. 260—500)

This invention relates to an improved method for preparing carbothiolic acids and more specifically pertains to an improved process for making thiolacetic acid.

Heretofore, it has been proposed that carbothiolic acids be prepared by reacting hydrogen sulfide with diacyl oxides or diacyl sulfides in the presence of such acidic catalysts as acetyl chloride, aluminum chloride, ferric chloride and sodium chloride either alone or in various combinations. Recently a method of preparing carbothiolic acids has been disclosed in U. S. Patent No. 2,412,036 whereby acetic anhydride or acetic anhydrosulfide is reacted with hydrogen sulfide in the presence of such alkaline materials as hydrated sodium sulfide, sodium hydroxide and sodium acetate. The reactions carried out in the presence of the acidic catalytic materials named above produce carbothiolic acids in exceptionally low yields, while the reaction carried out in the presence of the alkaline catalyst requires the use of high pressure and elevated temperature.

I have now discovered that carbothiolic acids such as thiolacetic acid are quite easily and economically obtained simply by reacting a water-soluble hydrosulfide with a diacyl oxide or diacyl sulfide. The reaction takes place in water solution at a temperature below room temperature and at atmospheric pressure, and proceeds as indicated in the following equation:

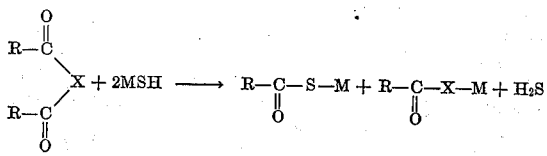

wherein R is a hydrocarbon radical, X is oxygen or sulfur and M is the cation of the water-soluble hydrosulfide. The reaction mixture is then acidified to convert the salts formed by the reaction to free acids, and the carbothiolic acid then recovered.

This process not only eliminates the direct use of hydrogen sulfide but also eliminates the need for expensive pressure equipment. Consequently, by following the practice of this invention a standard simple reaction vessel such as a wooden tank, light metal tank or the like may be used. Moreover, it is quite surprising that the above reaction takes place in aqueous solution inasmuch as hydrolysis of the diacyl oxide or sulfide could occur to form organic acid and the acid then react with the hydrosulfide in such a manner as to convert all the sulfur of the hydrosulfide into H₂S.

The water-soluble hydrosulfides which can be employed for the practice of this invention are the alkali metal hydrosulfides such as sodium hydrosulfide and potassium hydrosulfide, the alkaline earth hydrosulfides such as calcium hydrosulfide and barium hydrosulfide and also ammonium hydrosulfide.

The other reactant to be used according to this invention is either a diacyl oxide or a diacyl sulfide and is a compound which contains a divalent atom of a chalcogen element occurring in one of the short periods of the periodic table, said atom having each of its valences attached to a carbonyl group and said compound being otherwise composed of carbon and hydrogen atoms.

In carrying out the reaction the stoichiometric proportion of reactants as set forth in the above equation, or an excess of hydrosulfide, is preferablyl used. It is also preferred that the hydrosulfide be employed in a concentrated aqueous solution containing about 20 to 50% by weight of hydrosulfide and that this solution be added to the diacyl oxide or sulfide while maintaining the temperature of the reaction mixture at about 0 to 15% C.

When reacting acetic anhydride with a water-soluble hydrosulfide according to this invention, as is preferred, the aqueous reaction mixture contains both acetate and thioacetate. Upon acidification with excess 50% H₂SO₄ the acetate and thioacetate are converted into acetic and thioacetic acids and the acetic acid dissolves in the aqueous medium whereas the thioacetic acid separates out in an oily layer. The oily layer can then be dried and distilled to recover thioacetic acid in substantially pure form. With other diacyl oxides, it is often necessary to extract the organic acids resulting on acidification of the reaction mixture with an organic solvent such as ether and then to fractionate the extract to separate the carbothiolic acid. When diacyl sulfides are used, acidification of the reaction mixture yields crude carbothiolic acid which can be purified by distillation in the usual manner.

The following specific example in which the parts are by weight illustrates this invention.

Example

An aqueous solution containing 42 parts of water and 42 parts of 70% NaSH (0.525 mole) was charged to a reactor. After cooling this solution to 0° C., 25 parts of acetic anhydride of 95% purity (0.235 mole) were added dropwise to the aqueous solution with stirring in such a manner as to maintain a reaction temperature of about 5° C. The stirring was continued for 45 minutes after all the acetic anhydride had been added. The total elapsed reaction time was about 1 hour. The mixture was then acidified with 70 parts of 50% sulfuric acid whereupon an oil came out and was removed from the aqueous mixture. After drying the oil over calcium chloride and purifying the oil by distillation, 10.4 parts of a material boiling in the range of 85° to 88° C. at atmospheric pressure and having a refractive index of 1.4582 were recovered. This material was identified as thiolacetic acid. This represents a yield of 56% of theoretical.

This process is more economical than those processes employing hydrogen sulfide and acetic anhydride carried out at elevated temperature and pressure even though the yields obtained in the latter may be somewhat higher. As stated before, one of the economic objects of the process of this invention is the elimination of the use of pressurized hydrogen sulfide. Hydrogen sulfide is produced on an industrial scale at atmospheric pressure. It follows that a process employing hydrogen sulfide at 200 to 300 pounds per square inch pressure would require a compression system to pressurize the hydrogen sulfide adding considerable expense to the cost of hydrogen sulfide. As an alternative, compressed hydrogen sulfide would have to be purchased in cylinders. In either case the cost of the pressurized hydrogen sulfide is about 5 to 10 times the cost of sodium hydrosulfide used in the process of this invention. Thus, the cost per pound of thiolacetic acid produced by the method of this invention is lower than that of thiolacetic acid produced by reaction of acetic anhydride with hydrogen sulfide.

Any unsubstituted diacyl oxide or unsubstituted diacyl sulfide can be reacted with a hydrosulfide to form a carbothiolic acid, according to the process of this invention as hereinbefore described. In addition to acetic anhydride, diacyl oxides having the same or different hydrocarbon groups attached to the two carboxyl groups may be employed. Examples of other diacyl oxides which may be employed include propionic anhydride; butyric anhydride; valeric anhydride; caproic anhydride; heptylic anhydride; caprylic anhydride; lauric anhydride; cyclohexaneacetic anhydride; alpha-ethyl cyclohexaneacetic anhydride; cyclopentanetridecanoic anhydride; the anhydride of acetic acid with butyric acid; the anhydride of butyric acid with propionic acid; cyclohexanecarboxylic acid anhydride; cyclobutanecarboxylic acid anhydride; ortho-, para- and meta-methyl cyclohexanecarboxylic acid anhydrides; benzoic anhydride; ortho-, meta- and para-toluic anhydrides; alpha naphthoic anhydride and beta-naphthoic anhydride.

In addition, there may be employed diacyl oxides which contain a divalent hydrocarbon group having each of its valences satisfied by a carbonyl group which in turn is attached to an oxygen atom. Examples of such diacyl oxides include malonic anhydride, maleic anhydride, succinic anhydride, glutaric anhydride, adipic anhydride, pimelic anhydride, suberic anhydride, azelaic anhydride, sebacic anhydride, brassylic anhydride, thapsic anhydride, alpha-, beta-diethyl succinic anhydride, 1,2-cyclohexanedicarboxylic anhydride (hexahydrophthalic anhydride), 1,2-cyclobutanedicarboxylic anhydride (ethylene succinic anhydride), phthalic anhydride, diphenic anhydride, 1,2-naphthalenedicarboxylic anhydride, and 1,8-naphthalenedicarboxylic anhydride.

In addition to acetic anhydrosulfide, the diacyl sulfide corresponding to acetic anhydride, any of the diacyl sulfides corresponding to the acidic anhydrides named above, can be employed as reactants with the water-soluble sulfides in the process of this invention for preparing carbothiolic acids.

The carbothiolic acids or thiolacids produced by the method of this invention are useful in the synthesis of organic sulfur compounds especially thioesters which are prepared by reacting a carbothiolic acid with an unsaturated compound. From these thioesters many useful thiols can be prepared. In addition, the carbothiolic acids find use in analytical chemistry.

Although I have disclosed a specific example of the practices of this invention, I do not thereby desire or intend to limit myself solely thereto, for, as hitherto stated, the amount of reactants employed may be varied and chemical equivalents may be employed, if desired, without departing from the spirit and scope of this invention as defined in the appended claims.

I claim:

1. A process for the preparation of thiolacetic acid which comprises reacting acetic anhydride with a water-soluble hydrosulfide selected from the class consisting of alkali metal, alkaline earth metal and ammonium hydrosulfides, in an aqueous medium at a temperature below room temperature, acidifying the resulting aqueous mixture and recovering the thiolacetic acid.

2. A process for the preparation of thiolacetic acid which comprises reacting acetic anhydride with sodium hydrosulfide in an aqueous medium at a temperature below room temperature, acidifying the resulting aqueous mixture and recovering the thiolacetic acid.

3. A process for the preparation of a carbothiolic acid which comprises reacting in an aqueous medium and at a temperature below room temperature, a water-soluble hydrosulfide selected from the class consisting of alkali metal, alkaline earth metal and ammonium hydrosulfides, with a compound containing a bivalent atom of a chalcogen element occurring in one of the short periods of the periodic table, having each of the valences of said atom attached to a carbonyl group and being otherwise composed of carbon and hydrogen atoms, acidifying the resulting aqueous mixture and recovering the carbothiolic acid.

JOHN C. McCOOL.

REFERENCES CITED

The following references are of record in the file of this patent:

UNITED STATES PATENTS

| Number | Name | Date |
| --- | --- | --- |
| 2,412,036 | Ellingboe | Dec. 3, 1946 |

OTHER REFERENCES

Clarke et al.: J. Am. Chem. Soc. (1924), vol. 46, pp. 1731–1733.

Jacquemin: Comptes Rendus de l'Academie des Sciences, vol. 49, p. 371.

Kekule: Liebig's Annalen der Chemie, vol. 90, p. 311.